United States Patent
Yamashita et al.

(10) Patent No.: US 10,769,086 B2
(45) Date of Patent: Sep. 8, 2020

(54) RECORDING MEDIUM, ADAPTER, AND INFORMATION PROCESSING APPARATUS

(71) Applicant: Panasonic Intellectual Property Management Co., Ltd., Osaka (JP)

(72) Inventors: Hideaki Yamashita, Kyoto (JP); Takeshi Otsuka, Hyogo (JP); Masanori Mitsuzumi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/428,277

(22) Filed: Feb. 9, 2017

(65) Prior Publication Data

US 2017/0153999 A1    Jun. 1, 2017

Related U.S. Application Data

(63) Continuation of application No. PCT/JP2015/003838, filed on Jul. 30, 2015.

(30) Foreign Application Priority Data

Aug. 21, 2014   (JP) ................................. 2014-168161

(51) Int. Cl.
*G06F 13/16* (2006.01)
*G06F 13/14* (2006.01)
(Continued)

(52) U.S. Cl.
CPC ............ *G06F 13/385* (2013.01); *G06F 13/14* (2013.01); *G06F 13/16* (2013.01);
(Continued)

(58) Field of Classification Search
CPC .... G06F 13/385; G06F 13/16; G06F 13/4022; G06F 13/4282; G06F 2213/0026
See application file for complete search history.

(56) References Cited

U.S. PATENT DOCUMENTS

2006/0209196 A1   9/2006   Ohtsuka et al.
2008/0147904 A1*  6/2008   Freimuth ................ G06F 13/28
                                                         710/22
(Continued)

FOREIGN PATENT DOCUMENTS

CN     101206632 A    6/2008
CN     103858116 A    6/2014
(Continued)

OTHER PUBLICATIONS

International Search Report for corresponding International Application No. PCT/JP2015/003838 dated Sep. 8, 2015.
(Continued)

*Primary Examiner* — Tim T Vo
*Assistant Examiner* — Harry Z Wang
(74) *Attorney, Agent, or Firm* — Renner, Otto, Boisselle & Sklar, LLP

(57) ABSTRACT

A recording medium to be used by being connected to a digital device includes a local bus, a plurality of recording units, an information storage unit, and a communication unit. The local bus has a plurality of switches or bridges. The plurality of recording units are connected to the local bus. The information storage unit stores information indicating a bus configuration of the local bus. The communication unit is used for transferring the information to and from the digital device. After the recording medium is inserted into the digital device, the bus configuration of the local bus is reconstructed based on the information acquired from the communication unit via the information storage unit by the digital device.

6 Claims, 7 Drawing Sheets

(51) Int. Cl.
G06F 13/38 (2006.01)
H04N 5/907 (2006.01)
G06F 13/40 (2006.01)
G06F 13/42 (2006.01)

(52) U.S. Cl.
CPC ...... *G06F 13/4022* (2013.01); *G06F 13/4282* (2013.01); *H04N 5/907* (2013.01); *G06F 2213/0026* (2013.01)

(56) References Cited

U.S. PATENT DOCUMENTS

| | | | | |
|---|---|---|---|---|
| 2008/0192648 | A1* | 8/2008 | Galles | ...................... H04L 69/32 370/254 |
| 2010/0036995 | A1* | 2/2010 | Nakayama | .......... G06F 13/4022 710/316 |
| 2012/0079139 | A1* | 3/2012 | Sonokawa | .......... H04L 43/0811 710/16 |
| 2012/0265912 | A1* | 10/2012 | Hess | ...................... G06F 13/126 710/301 |
| 2013/0297894 | A1* | 11/2013 | Cohen | ................... G06F 3/0679 711/154 |
| 2014/0181327 | A1 | 6/2014 | Cohen et al. | |
| 2014/0201401 | A1 | 7/2014 | Tokumitsu | |

FOREIGN PATENT DOCUMENTS

| | | |
|---|---|---|
| JP | 2004-343682 A | 12/2004 |
| JP | 2014-137614 A | 7/2014 |

OTHER PUBLICATIONS

English Translation of Chinese Search Report dated Mar. 4, 2019 for the related Chinese Patent Application No. 201580043986.3.

* cited by examiner

FIG. 3

Type1 Configuration Space Header

| | | | | Byte Offset |
|---|---|---|---|---|
| Device ID | | Vendor ID | | 00h |
| Status | | Command | | 04h |
| Class Code | | | Revision ID | 08h |
| BIST | Header Type | Primary Latency Timer | Cache Line Size | 0Ch |
| Base Address Register 0 | | | | 10h |
| Base Address Register 1 | | | | 14h |
| Secondary Latency Timer | Subordinate Bus Number | Secondary Bus Number | Primary Bus Number | 18h |
| Secondary Status | | I/O Limit | I/O Base | 1Ch |
| Memory Limit | | Memory Base | | 20h |
| Prefetchable Memory Limit | | Prefetchable Memory Base | | 24h |
| Prefetchable Base Upper 32 Bits | | | | 28h |
| Prefetchable Limit Upper 32 Bits | | | | 2Ch |
| I/O Limit Upper 16 Bits | | I/O Base Upper 16 Bits | | 30h |
| Reserved | | | Capability Pointer | 34h |
| Expansion ROM Base Address | | | | 38h |
| Bridge Control | | Interrupt Pin | Interrupt Line | 3Ch |

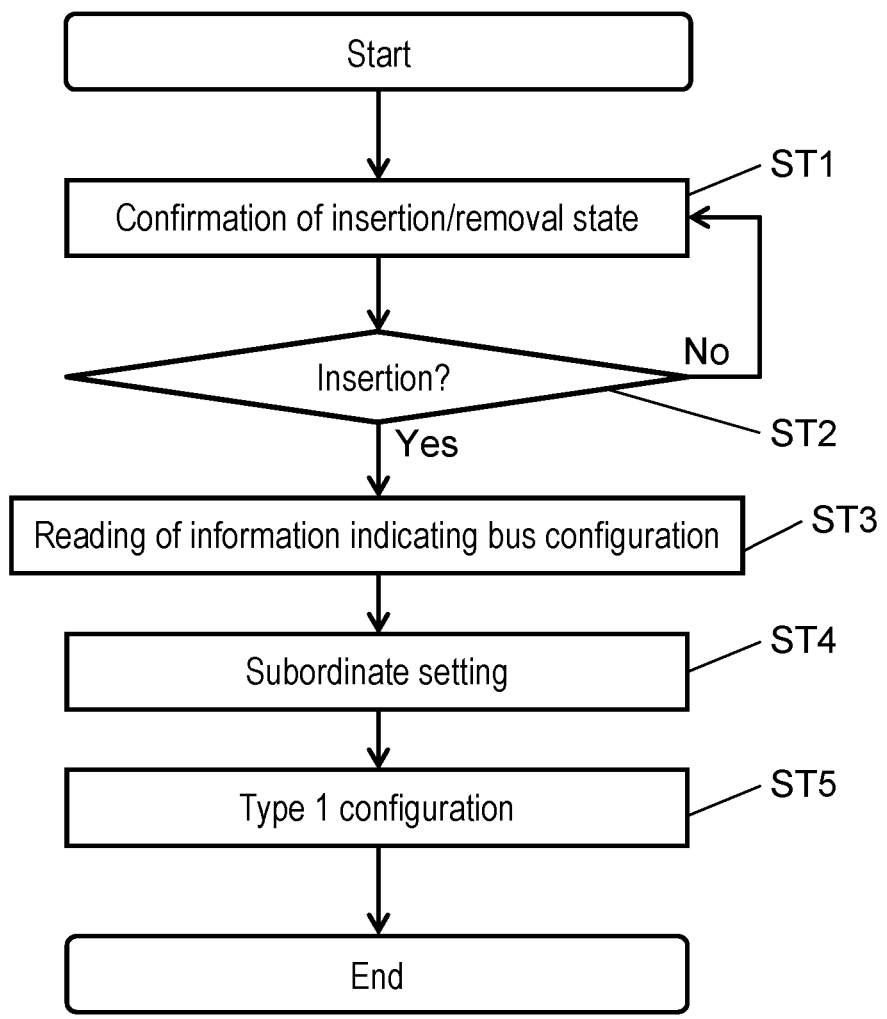

RECORDING MEDIUM, ADAPTER, AND INFORMATION PROCESSING APPARATUS

BACKGROUND

1. Technical Field

The present disclosure relates to a recording medium, and an adapter and an information processing apparatus using the recording medium.

2. Description of Related Art

A memory card, which is a card type recording medium incorporating a flash memory such as an SD card, is ultra-small and ultra-thin, and is widely used for a digital device such as a digital still camera, because of its ease of handling. In addition, for example, in a technique described in Unexamined Japanese Patent Publication No. 2004-343682, increase in speed and increase in capacity of the recording medium are achieved by incorporating a plurality of flash memories in the recording medium and by performing striping transfer.

However, in a technique described in Patent Literature 1, since increase in speed of a recording medium has been achieved by mounting a controller on the recording medium side, and by performing striping transfer with recording medium-side firmware, cost of a recording medium has been increased.

SUMMARY

The inventor of the present disclosure has devised a configuration in which cost reduction of the recording medium is achieved by mounting the controller on a host device side, and by performing processing of striping transfer with host device-side firmware. However, in this configuration, when the recording medium is inserted and removed, a switch and a bridge incorporated in the recording medium are also inserted and removed. It causes the host device side to search a bus and to reconstruct a bus configuration each time the recording medium is inserted. Accordingly, reconstruction of the bus configuration requires more time, at each time when recording medium is inserted, to search which comply with maximum bus configuration which standard defines.

A recording medium according to the present disclosure is a recording medium to be used by being connected to a digital device, and includes a local bus, a plurality of recording units, an information storage unit, and a communication unit. The local bus has a plurality of switches or bridges. The plurality of recording units are connected to the local bus. The information storage unit stores information indicating a bus configuration of the local bus. The communication unit is used for transferring the information to and from the digital device. After the recording medium is inserted into the digital device, the bus configuration of the local bus is reconstructed based on the information acquired from the information storage unit via the communication unit by the digital device.

In addition, an adapter according to the present disclosure is an adapter in which a recording medium is inserted and removed, the recording medium including a local bus having a plurality of switches or bridges and an information storage unit for storing information indicating a bus configuration of the local bus. The adapter includes a bus searcher, an insertion/removal detector, and an information acquisition unit. The bus searcher sets a bus number from a root bus for each of the plurality of switches or bridges to construct the bus configuration. The insertion/removal detector detects insertion and removal of the recording medium to and from the adapter. The information acquisition unit acquires information from the information storage unit. After insertion of the recording medium is detected by the insertion/removal detector, the bus searcher sets a subordinate bus number of each of the plurality of switches or bridges based on the information acquired by the information acquisition unit, and then reconstructs the bus configuration.

In addition, an information processing apparatus according to the present disclosure includes a host device having an interface, the above-described adapter connected to the host device via the interface, and the above-described recording medium.

According to the recording medium, the adapter, and the information processing apparatus of the present disclosure, it is possible to identify the bus configuration of the recording medium by acquisition of the information indicating the bus configuration in the recording medium at the time of insertion of the recording medium, and to quickly perform the search of the bus and reconstruction of the bus configuration.

BRIEF DESCRIPTION OF THE DRAWINGS

FIG. 3 is a diagram illustrating an address map of a configuration space that conforms to PCIe and is included in a switch according to the first exemplary embodiment;

FIG. 4 is a flowchart for explaining a configuration cycle in the first exemplary embodiment;

DETAILED DESCRIPTION

Hereinafter, an exemplary embodiment will be described in detail with reference to the drawings as appropriate. However, an explanation that is more detailed than necessary may be omitted. For example, a detailed description of an already well-known matter or a redundant description for substantially the same configuration may be omitted. This is to avoid the following description from becoming unnecessarily redundant, and to facilitate understanding of those skilled in the art.

Note that the accompanying drawings and the following description are provided for those skilled in the art to fully understand the present disclosure, and is not intended to limit the claimed subject matter.

First Exemplary Embodiment

Hereinafter, a first exemplary embodiment will be described with reference to FIGS. 1 to 7.

1-1. Configuration

1-1-1. Configuration Diagram of Information Processing Apparatus

Figure 1:
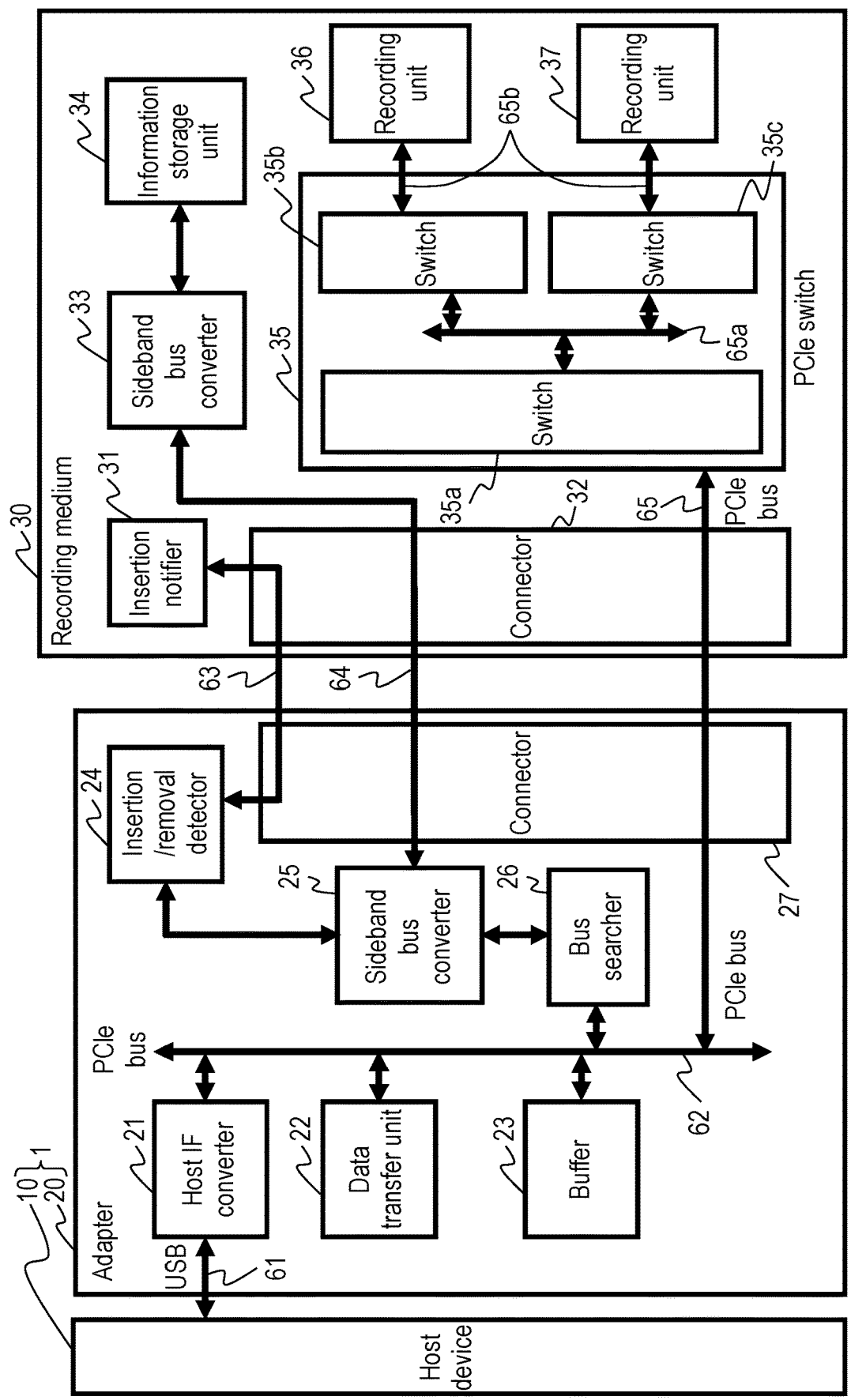
FIG. 1 is a block diagram of an information processing apparatus according to a first exemplary embodiment.

FIG. 1 is a block diagram of an information processing apparatus in a first exemplary embodiment. A camera for business use as an example of the information processing apparatus includes host device 10 (for example, a Professional Plug-In (P2) device), adapter 20 (for example, a conversion adapter), and recording medium 30 (for example, an expressP2 card). Digital device 1 (for example, a camcorder) is configured by host device 10 and adapter 20. Recording medium 30 can be inserted and removed to and from digital device 1. Since digital device 1 is configured to use adapter 20, recording medium 30 can be used even by a general purpose personal computer having a general purpose interface, and even by a current P2 device. In addition, recording medium 30 can be mutually used between digital devices 1 having different compatible card sizes.

In the following example, to clarify features of the present disclosure, units necessary for the camera for business use, such as an imaging unit and an image processing unit, are omitted from host device 10 of FIG. 1.

Host device 10 has Universal Serial Bus (USB) 61 that is a general purpose interface for a personal computer or the like, and is connected to adapter 20 via the general purpose interface.

Adapter 20 includes a PCI bus or a PCI Express (PCIe) bus, each of which is standardized by Peripheral Component Interconnect Special Interest Group (PCI-SIG) and is a general purpose local bus in adapter 20, as an external interface. In the first exemplary embodiment, a description is made of a case where the external interface is PCIe bus 62.

Recording medium 30 includes PCIe bus 65 that is a common protocol with the general purpose local bus in adapter 20, as a local bus, and is connected to adapter 20 by PCIe bus 65. Further, recording medium 30 includes detection signal line 63 for insertion/removal detection, and is compatible with hot-swap in a connection between adapter 20 and recording medium 30, with detection signal line 63. In addition, recording medium 30 includes a communication unit for transferring to and from recording medium 30 information indicating a bus configuration in recording medium 30, as a communication device to be used until the connection of the PCIe bus is established between adapter 20 and recording medium 30. Until the connection of the PCIe bus is established, adapter 20 and recording medium 30 are connected together with sideband bus 64 as the communication unit.

Adapter 20 performs data transfer between host device 10 and recording medium 30. The data transfer is performed by striping transfer, and data captured by the imaging unit of host device 10 is written in recording medium 30, or is read from recording medium 30. In addition, adapter 20 constructs the bus configuration by setting a bus number from a root bus for each of switches 35a to 35c as an example of the plurality of switches or bridges constituting components of PCIe bus 65.

An internal configuration of adapter 20 will be described below.

Host interface converter (host IF converter) 21 performs protocol conversion between USB 61 that is an interface with host device 10 and PCIe bus 62 that is an internal local bus, and performs data transfer with host device 10. Buffer 23 temporarily holds the data, for increase in speed of protocol conversion and data transfer, during data transfer between host device 10 and recording medium 30. Data transfer unit 22 performs data transfer between host IF converter 21 and buffer 23, and performs data transfer between buffer 23 and recording medium 30.

Insertion/removal detector 24 has a function of monitoring a signal of detection signal line 63 between adapter 20 and recording medium 30 in order to detect insertion and removal of the recording medium 30 to and from adapter 20. Sideband bus converter 25 is an information acquisition unit for acquiring the information indicating the bus configuration from recording medium 30. For that reason, sideband bus converter 25 has a function of converting data stored in recording medium 30 into data of a protocol defined between adapter 20 and recording medium 30 and reading the data. Sideband bus 64 performs communication by, for example, Inter-Integrated Circuit (I2C).

Bus searcher 26 can be configured by, for example, a general purpose CPU. Bus searcher 26 has a function of grasping the bus configuration of PCIe bus 65 in recording medium 30, and performing initial setting. The initial setting of the bus configuration will be described later. Connector 27 is a connector in which signal lines are collected to enable physical connection of recording medium 30.

Recording medium 30 has a function of recording data from adapter 20 and reading the recorded data.

A configuration of an inside of recording medium 30 will be described below.

Connector 32 is a connector in which signal lines are collected to enable physical connection with connector 27. Insertion notifier 31 notifies adapter 20 via detection signal line 63 of information indicating that recording medium 30 is connected to adapter 20.

Information storage unit 34 stores information relating to recording medium 30. The information stored in information storage unit 34 will be described later. Sideband bus converter 33 notifies adapter 20 of the information from information storage unit 34 in accordance with the protocol of sideband bus 64 defined between adapter 20 and recording medium 30.

Switcher 35 is a device including a plurality of PCIe ports, and includes switches 35a to 35c. PCIe bus 65 distributes the bus by using PCIe buses 65a, 65b so that adapter 20 can be connected to a plurality of recording units 36, 37 constituting end points via switches 35a to 35c of switcher 35.

Recording units 36, 37 (for example, memory cards) are connected to PCIe bus 62 of adapter 20 via switches 35a to 35c. Each of recording units 36, 37 internally includes a controller for performing data transfer for reading and writing of the data to adapter 20.

In a case where PCIe bus 65b is configured by a bus different from PCIe bus 65a, since it is necessary to perform protocol conversion, it is necessary to use bridges constituting components of PCIe bus 65 instead of switches 35b, 35c.

1-1-2. Configuration of Information Storage Unit

Figure 2:
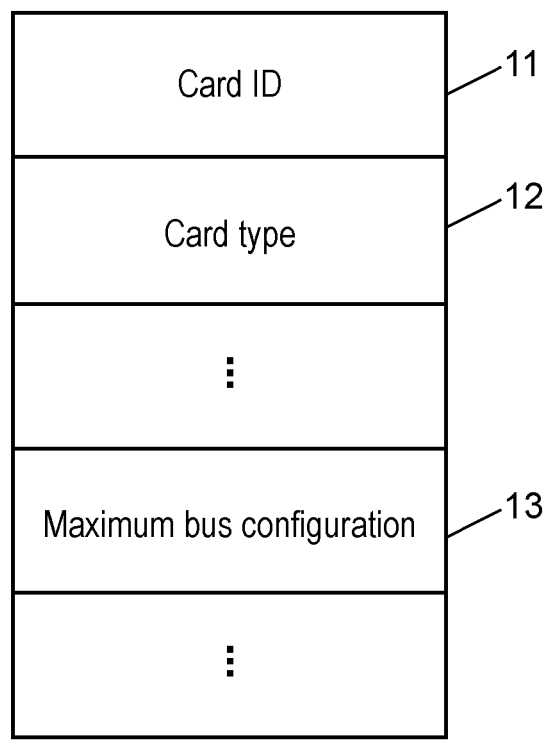
FIG. 2 is a diagram illustrating information stored in an information storage unit according to the first exemplary embodiment.

FIG. 2 is a diagram illustrating information stored in the information storage unit according to the first exemplary embodiment. In information storage unit 34, the information indicating the bus configuration of PCIe bus 65 is stored. An example of the information indicating the bus configuration includes card information. The card information includes card ID 11 that is an identifier of each of recording units 36, 37, card type information 12 provided for compatibility with a plurality of types of cards, and maximum bus information 13 indicating a maximum value of a number of buses (maximum bus configuration) on PCIe bus 65.

1-1-3. Configuration Space of Switch

FIG. 3 is a diagram illustrating an address map of a configuration space that conforms to PCIe and is included in the switch according to the first exemplary embodiment. The configuration space is an area in which management or setting of a status of PCIe bus 65 is performed, and has an 8-bit length address space. A register of the configuration space is referred to as a configuration register. The configuration space indicates a function included in each of switches 35a to 35c, and switches 35a to 35c are controlled by writing to the space. Thus, access is possible to recording units 36, 37 that are ahead of switches 35b, 35c, respectively.

Specifically, main configuration registers used for control are base address registers [0, 1] each indicating an address space of a lower order bus, a primary bus number indicating a master bus number, a secondary bus number indicating a slave bus number, and a subordinate bus number indicating a terminal bus number.

Based on these configuration registers, each of switches 35a to 35c transfers a subset, of a request for reading and writing access to memory space, from upper order bus to lower order bus. When an address of reading and writing is an address belonging to a lower order memory space, the address is transferred from an upper order bus to a lower order bus. When the address of reading and writing is another address not belonging to the lower order bus, the request is ignored. By this filtering, the request is prevented from meaninglessly flowing to the lower order bus. For this filtering, each of switches 35a to 35c manages a base address of a memory space that needs to be transferred from a primary bus to a secondary bus.

To perform configuration of the bus, it is necessary to initialize the configuration space illustrated in FIG. 3. A configuration cycle is used to access the configuration register. In the PCIe standard, there exist a Type 1 configuration cycle for performing control to switches 35a to 35c and a Type 0 configuration cycle for performing control to a device. The Type 1 configuration cycle designates the bus number to access the switches 35a to 35c. For PCI configuration access, access is performed under the following rules.

(1) In a case where the requested bus number does not exist between the secondary bus number and the subordinate bus number of each of switches 35a to 35c, the Type 1 configuration cycle is ignored.

(2) In a case where the requested bus number coincides with the secondary bus number of each of switches 35a to 35c, the Type 1 configuration cycle is converted to the Type 0 configuration cycle.

(3) In a case where the requested bus number is greater than the secondary bus number of each of switches 35a to 35c and equal to or less than the subordinate bus number, the request is directly sent to the secondary bus.

1-2. Operation

FIG. 4 is a flowchart for explaining the configuration cycle in the first exemplary embodiment. Operation for quickly performing configuration in a case where recording medium 30 is inserted to adapter 20 and host device 10 configured as described above will be described with reference to FIG. 4.

When adapter 20 is connected to host device 10, adapter 20 is initialized to a start state. In ST1, adapter 20 confirms an insertion/removal state of recording medium 30 by detecting insertion/removal of recording medium 30 to and from adapter 20 with insertion/removal detector 24.

In ST2, branching is performed depending on whether or not recording medium 30 is inserted. In a case where recording medium 30 is not inserted, the operation returns to ST1 again, and in a case where recording medium 30 is inserted, the operation proceeds to ST3.

In ST3, maximum bus information 13 indicating the maximum bus configuration is read as the card information in recording medium 30 illustrated in FIG. 2, from information storage unit 34 via sideband bus converter 33, with sideband bus converter 25.

In ST4, based on read maximum bus information 13, bus searcher 26 sets the subordinate bus number of each of switches 35a to 35c of recording medium 30.

In the PCIe standard, it is necessary to set the subordinate bus number for each of switches 35a to 35c besides the primary bus number and the secondary bus number. In the first exemplary embodiment, this can be realized by reading maximum bus information 13 stored in information storage unit 34 and setting the subordinate bus number of an end to an optimal value.

In the first exemplary embodiment, bus searcher 26 of a digital device 1 side acquires the card information from information storage unit 34 of a recording medium 30 side with sideband bus converter 25, and recognizes the bus configuration in recording medium 30. For that reason, the search in which the maximum configuration on the standard is assumed as in the conventional method is not required, and a search range of the bus configuration can be identified without performing such search. Therefore, the search of the bus and reconstruction of the bus configuration can be performed quickly.

The search of the bus and reconstruction of the bus configuration by the first exemplary embodiment and the conventional method are described below with reference to FIG. 5 to FIG. 7.

Figure 5:
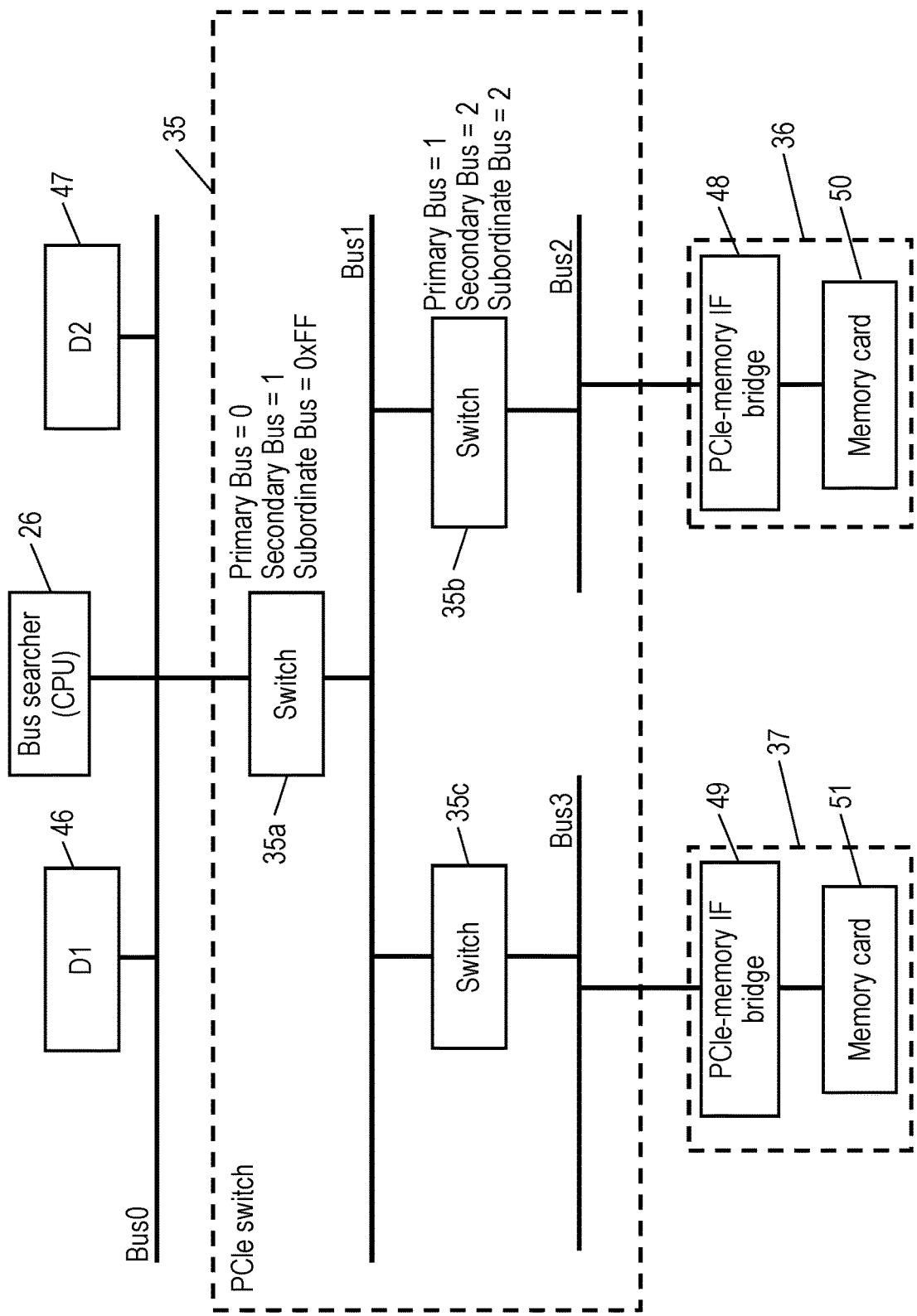
FIG. 5 is an explanatory diagram of a configuration cycle in a conventional information processing apparatus.
Figure 6:
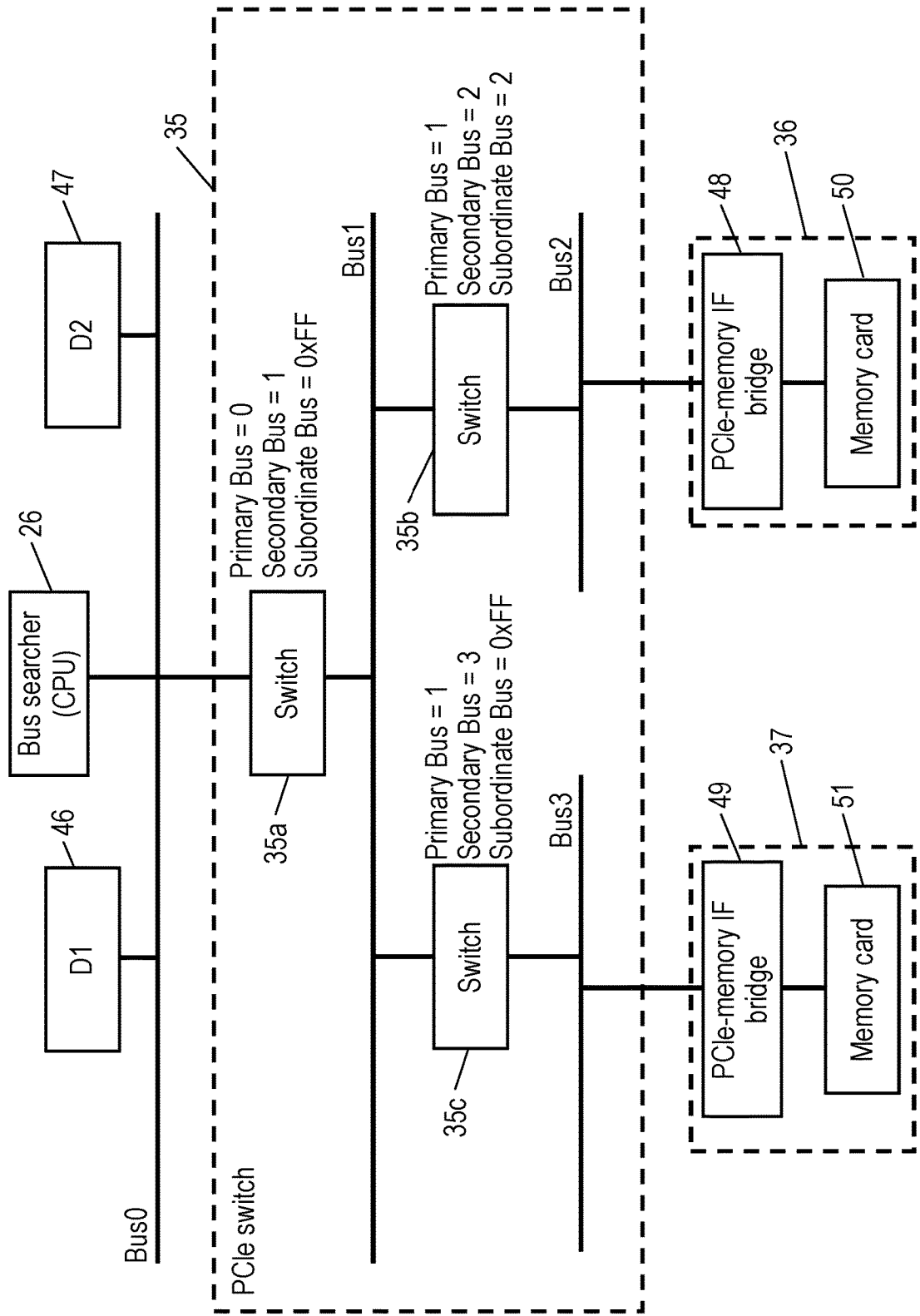
FIG. 6 is an explanatory diagram of the configuration cycle in the conventional information processing apparatus.
Figure 7:
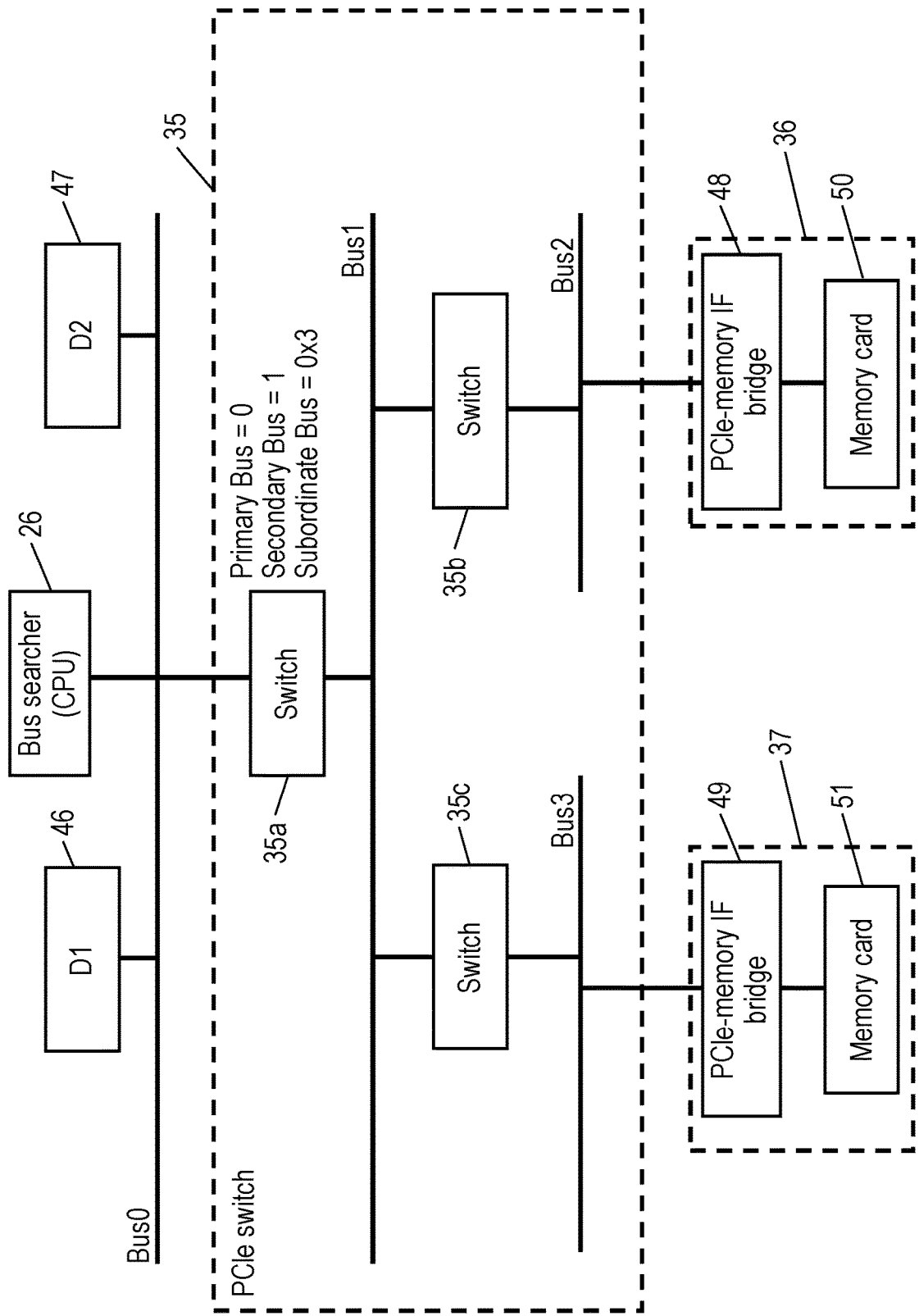
FIG. 7 is an explanatory diagram of the configuration cycle in the first exemplary embodiment.

Each of FIG. 5, FIG. 6 is an explanatory diagram of a configuration cycle in a conventional information processing apparatus, and is an explanatory diagram of a configuration cycle of a specific bus for ST5 in FIG. 4. Each of FIG. 5, FIG. 6 illustrates PCIe system components extracted from FIG. 1, in which the components are required in the configuration cycle of the bus. The components includes bus searcher 26, switches 35a to 35c, devices 46, 47, recording units 36, 37, PCIe-memory IF bridges 48, 49, and memory cards 50, 51.

First, in FIG. 5, bus searcher 26 detects switch 35a as the first PCIe switch, by the search of the bus. A number of Bus1 is given to a bus (root bus) existing in a lower order of switch 35a. To switch 35a, the secondary bus number of 1 is assigned, and the subordinate bus number of 0xFF is temporarily assigned. Thus, in a case where the bus number is 1 or greater and the bus number is the subordinate bus number or less, a request of the Type 1 configuration cycle is requested to Bus1 through switch 35a. Further, bus searcher 26 searches Bus1, and detects switch 35b. Since there is no switch below switch 35b, the subordinate bus number of 2 is assigned to switch 35b. The secondary bus number is determined at this time.

FIG. 6 is a diagram for explaining the configuration cycle of a further lower order bus. Bus searcher 26 returns to the search of Bus1, and detects switch 35c that is the next switch. To switch 35c, the primary bus number of 1 is assigned, and the secondary bus number of 3 is assigned. In addition, the subordinate bus number of 0xFF is assigned. By processing up to this point, access to an appropriate bus is possible with the Type 0 configuration cycle for Bus1, Bus2, Bus3.

In this way, in the conventional method, when a number of the switch is set with a generic algorithm, the subordinate bus number relating to the switch has been unknown at the time of search start. For that reason, the configuration cycle has been completed by repeating processing in which the maximum value 0xFF is set in a computational manner, and the search is performed for all switches existing in the lower order, and the subordinate bus number is assigned.

Next, in FIG. 7, operation for limiting the search range according to the first exemplary embodiment will be described. FIG. 7 is an explanatory diagram of the configuration cycle in the first exemplary embodiment.

In the first exemplary embodiment, the bus configuration of PCIe bus 65 is reconstructed based on the card information acquired from information storage unit 34 via sideband bus 64 by digital device 1. Specifically, bus searcher 26 sets the subordinate bus number of each of switches 35a to 35c configuring PCIe bus 65, and then reconstructs the bus configuration of PCIe bus 65. Setting of the subordinate bus number is performed based on the card information acquired by sideband bus converter 25 after insertion of recording medium 30 is detected by insertion/removal detector 24.

In ST3 of FIG. 4, sideband bus converter 25 reads the card information in recording medium 30, and confirms that the maximum bus configuration is 3.

In ST4, the subordinate bus number of switch 35a is set to 3. By this setting, in ST5, bus searcher 26 sets the bus number of each of switches 35a to 35c with general purpose bus configuration access cycle. At this time, since the subordinate bus number is set in advance, it is possible to set the bus number by the search up to the set bus number, without performing the search up to 0xFF.

1-3. Effects

As described above, in the first exemplary embodiment, adapter 20 of the digital device 1 side acquires the card information from information storage unit 34 of the recording medium 30 side with sideband bus converter 25, and recognizes the bus configuration in recording medium 30. For that reason, the search in which the maximum configuration on the standard is assumed as in the conventional method is not required, and a search range of the bus configuration can be identified without performing such search. Therefore, the search of the bus and reconstruction of the bus configuration can be performed quickly.

In addition, in a case where a plurality of recording media 30 are handled, a quick startup is also possible by reduction of control software processing. In particular, in a case where the plurality of recording media 30 are inserted substantially at the same time, it is also possible to startup more quickly by reduction of control software processing.

In addition, a similar effect is obtained even when the information processing apparatus is configured as one apparatus by host device 10, adapter 20, and recording medium 30.

In addition, in a case where digital device 1 is configured by host device 10 and adapter 20, recording medium 30 is inserted and removed to and from digital device 1.

In addition, in the first exemplary embodiment, digital device 1 including adapter 20 sets the bus number from the root bus for each of switches 35a to 35c to construct the bus configuration. However, digital device 1 not including adapter 20 may set the bus number from the root bus for each of switches 35a to 35c to construct the bus configuration.

In addition, in the first exemplary embodiment, an example has been described in which sideband bus 64 performs communication by using I2C; however, a similar effect is obtained even when a communication protocol such as Universal Asynchronous Receiver Transmitter (DART) is used.

In the first exemplary embodiment, recording medium 30 uses two recording units 36, 37; however, the present disclosure is not limited thereto, and the number of recording units can be selected as appropriate in accordance with a transfer rate during striping transfer, and a plurality of recording units of any number, for example three, can be used.

The present disclosure can be applied to an information processing apparatus for recording an image on a removable recording medium. Specifically, the present disclosure can be applied to a camera for business use, a digital still camera, a movie camera, and the like.

What is claimed is:

1. A recording medium which is connectable to a digital device, the recording medium comprising:
 a local bus including a plurality of switches or bridges and connected to the digital device;
 a plurality of recorders connected to the local bus, the local bus distributed into a number of buses so that the plurality of recorders connects to the digital device via the plurality of switches or bridges;
 an information storage which stores information indicating a bus configuration of the local bus, the bus configuration includes the number of buses; and
 a communication bus connected to the information storage and configured to transfer the information to the digital device, wherein the communication bus is different from the local bus,
 wherein, after insertion of the recording medium into the digital device is detected, a subordinate bus number of each of the plurality of switches or bridges is set based on the information indicating the bus configuration acquired from the information storage via the communication bus by the digital device including setting the subordinate bus number to the number of buses.

2. The recording medium according to claim 1, wherein the local bus is a PCI bus or a PCIe bus.

3. The recording medium according to claim 2, wherein the communication bus is a sideband bus different from the PCI bus or the PCIe bus.

4. An adapter in which a recording medium is inserted and removed, the recording medium including multiple recording units, a local bus, an information storage and a communication bus, the local bus including a plurality of switches or bridges, the local bus distributed into a number of buses such that the multiple recording units connect to the adapter via the plurality of switches or bridges, the information storage stores information indicating a bus configuration of the local bus, the bus configuration includes the number of buses, and the communication bus being different from the local bus and configured to transfer the information to the adapter, the adapter comprising:
 a processor configured to:
  set a bus number from a root bus for each of the plurality of switches or bridges to construct a bus configuration, and
  acquire the information indicating the bus configuration from the information storage via the communication bus; and
 a detector configured to detect insertion and removal of the recording medium to and from the adapter;
 wherein, after insertion of the recording medium is detected by the detector, the processor configured to set a subordinate bus number of each of the plurality of switches or bridges based on the information indicating the bus configuration acquired via the communication bus including setting the subordinate bus number to the number of buses, and then reconstruct the bus configuration.

5. An information processing apparatus comprising:
a host device having an interface;
the adapter according to claim 4, which is connected to the host device via the interface; and
the recording medium according to claim 4.

6. The information processing apparatus according to claim 5, wherein the digital device is configured by the host device and the adapter.

\* \* \* \* \*